United States Patent [19]
Arroyo et al.

[11] Patent Number: 4,781,433
[45] Date of Patent: Nov. 1, 1988

[54] OPTICAL FIBER PLENUM CABLE AND METHODS OF MAKING

[75] Inventors: Candido J. Arroyo, Lilburn; Jay T. Loadholt, III, Roswell, both of Ga.; Emanuele Scalco, Martinsville, N.J.; Palmer D. Thomas, Tucker, Ga.

[73] Assignees: American Telephone and Telegraph Company, AT&T Bell Laboratories, Murray Hill; AT&T Technologies, Inc., Berkeley Heights, both of N.J.

[21] Appl. No.: 946,646

[22] Filed: Dec. 22, 1986

Related U.S. Application Data

[63] Continuation-in-part of Ser. No. 728,978, Apr. 30, 1985, abandoned.

[51] Int. Cl.⁴ .............................................. G02B 6/44
[52] U.S. Cl. .................................. 350/96.23; 264/1.5
[58] Field of Search .................... 350/96.23; 264/1.5; 174/121 A

[56] References Cited

U.S. PATENT DOCUMENTS

| | | | |
|---|---|---|---|
| 3,823,255 | 7/1974 | LaGase et al. | 174/113 R |
| 3,983,313 | 9/1976 | Ney et al. | 174/121 SR |
| 4,037,923 | 7/1977 | Beal | 350/96.23 |
| 4,172,106 | 10/1979 | Lewis | 264/1.5 |
| 4,284,842 | 8/1981 | Arroyo et al. | 174/107 |
| 4,302,073 | 11/1981 | Bendayan et al. | 350/96.23 |
| 4,312,565 | 1/1982 | Oestreich et al. | 350/96.23 |
| 4,319,940 | 3/1982 | Arroyo et al. | 156/56 |
| 4,510,348 | 4/1985 | Arroyo et al. | 174/121 A |
| 4,595,793 | 6/1986 | Arroyo et al. | 174/121 A |
| 4,605,818 | 8/1986 | Arroyo et al. | 350/96.23 X |
| 4,653,851 | 3/1987 | Pedersen et al. | 350/96.23 |
| 4,687,294 | 8/1987 | Angeles | 350/96.23 |

FOREIGN PATENT DOCUMENTS

| | | | |
|---|---|---|---|
| 3201981 | 8/1983 | Fed. Rep. of Germany | 350/96.23 |
| 3236395 | 4/1984 | Fed. Rep. of Germany | 350/96.23 |
| 2106663 | 4/1983 | United Kingdom | 350/96.23 |
| 2138168 | 10/1984 | United Kingdom | 350/96.23 |

OTHER PUBLICATIONS

Pirelli Brochure, "Fiber Optic Plenum Cables," undated, 2 pages.
Pirelli Brochure, "One and Two Channel Optical Communications Cables," undated, 8 pages.
Pennwalt Corp. Brochure PL—148—A—3—8—1—W77020—5M, "KYNAR® Polyvinylidene Fluoride," undated, 28 pages.
Fasig et al, "Performance of Fluoropolymer Wire and Cable Insulation in . . . ", 26th Int. Wire and Cable Symposium, Cherry Hill, N.J., 11—1977, pp. 1-22.

*Primary Examiner*—John Lee
*Attorney, Agent, or Firm*—Edward W. Somers

[57] ABSTRACT

An optical fiber cable particularly suited for use in building distribution systems includes a core which comprises a plurality of coated optical fibers (22—22) with each being enclosed in a plastic buffer (26). The optical fibers are individually or collectively enclosed in a fibrous strength member. Over the strength member in each of several embodiments is provided an outer jacket comprising a plastic material having excellent resistance to flame spread and smoke evolution. The plastic material comprising the jacket is disposed about the strength member and decoupled sufficiently therefrom to avoid the introduction of microbending stresses in the optical fiber. This may be accomplished by vacuum sizing the plastic material which has been tubed over an advancing optical fiber core as the plastic material is being drawn down onto the strength member.

20 Claims, 3 Drawing Sheets

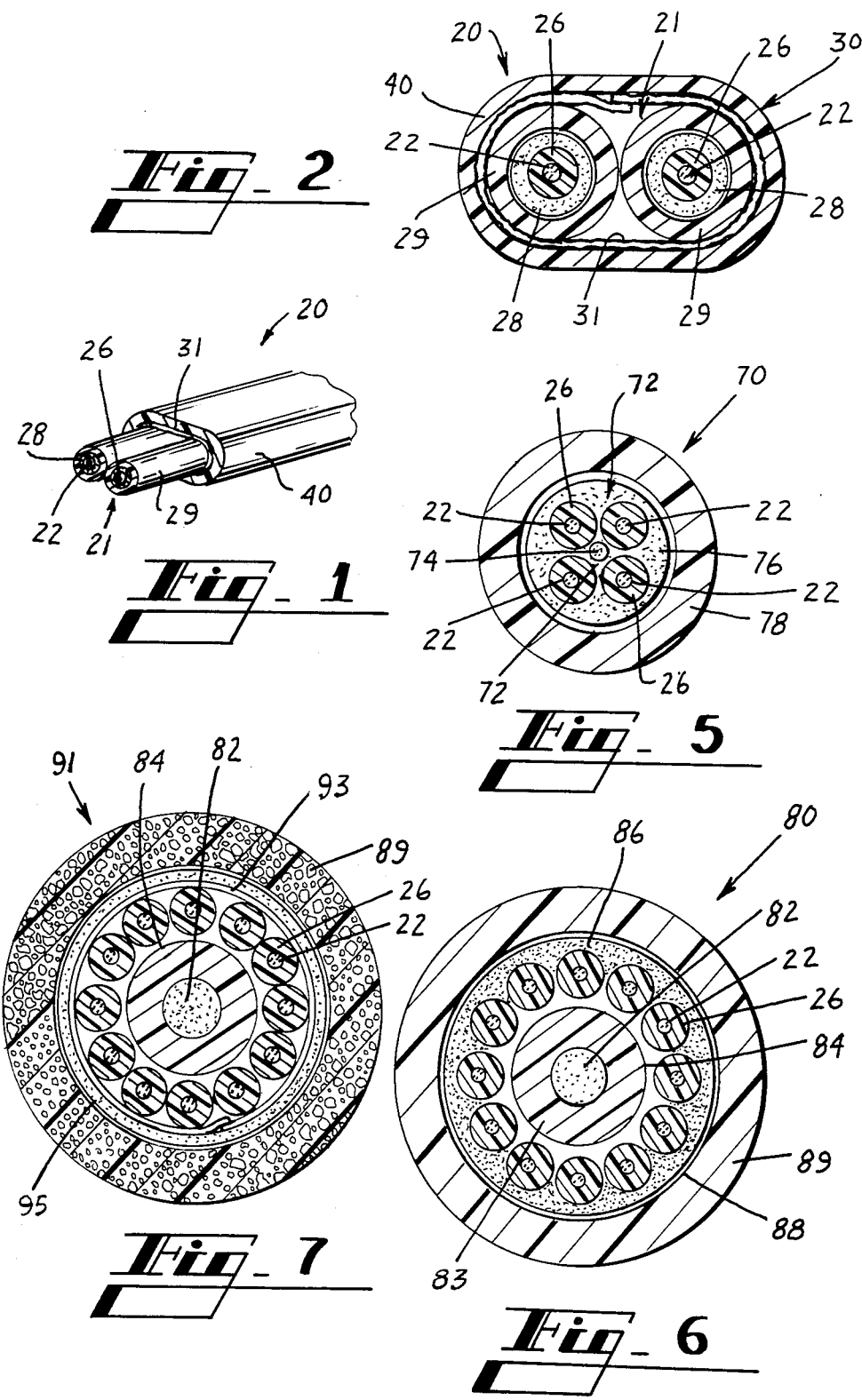

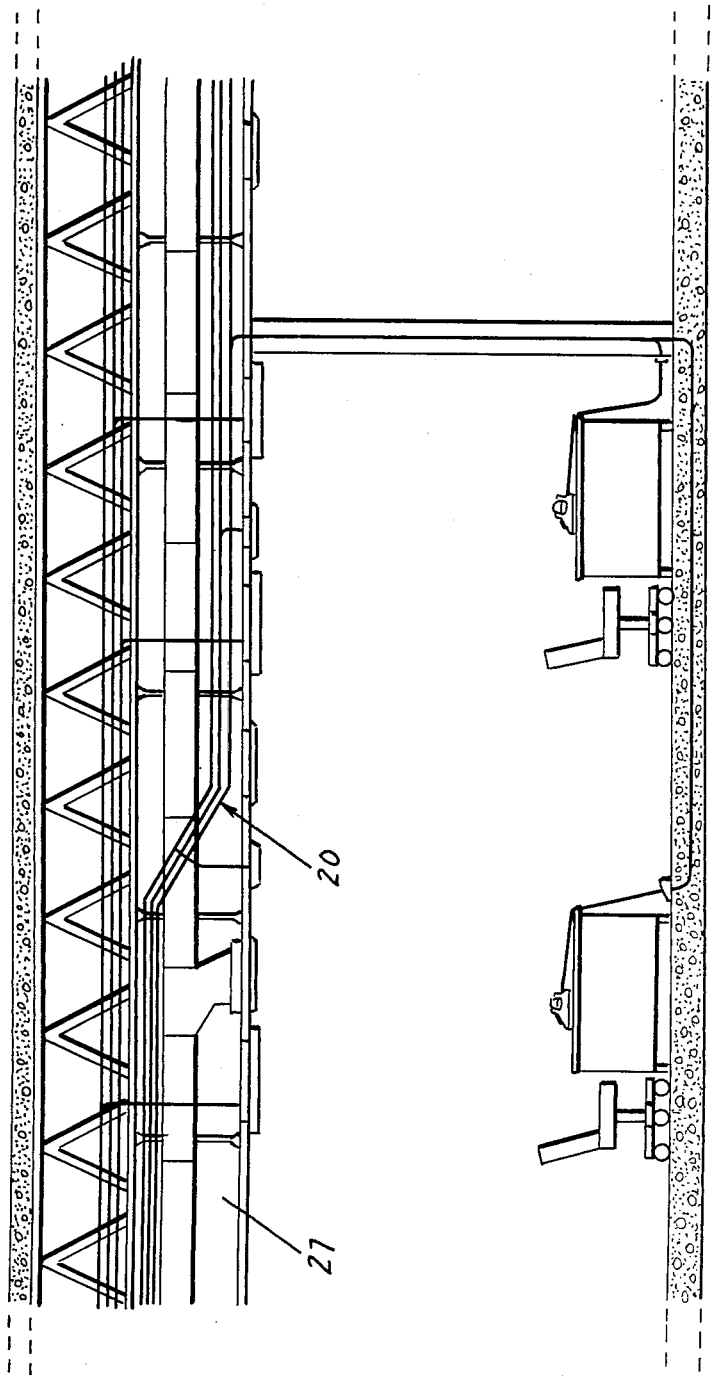

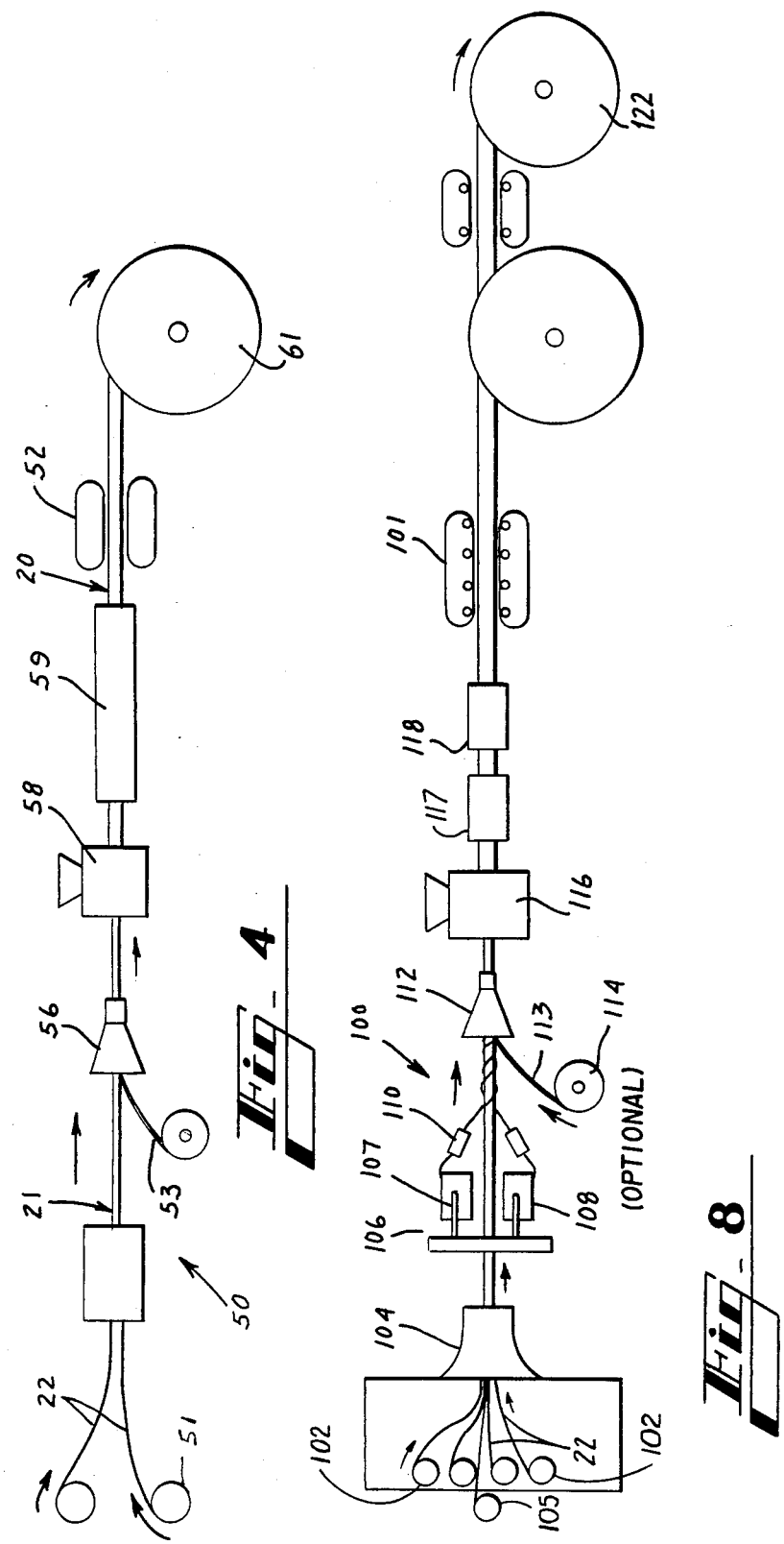

OPTICAL FIBER PLENUM CABLE AND METHODS OF MAKING

This application is a continuation-in-part of application Ser. No. 728,978 filed Apr. 30, 1985 now abandoned.

TECHNICAL FIELD

This invention relates to an optical fiber cable and to methods of making it. More particularly, it relates to an optical fiber cable suitable for communications use, for example, in building plenums and which includes an optical fiber core and an outer jacket which is made of a plastic material which is decoupled substantially from the core to avoid the introduction of microbending properties of the cable.

BACKGROUND OF THE INVENTION

In the construction of many buildings, a finished ceiling, which is referred to as a drop ceiling, is spaced below a structural floor panel that is constructed of concrete, for example. Light fixtures as well as other items appear below the drop ceiling. The space between the ceiling and the structural floor from which it is suspended serves as a return-air plenum for elements of heating and cooling systems as well as a convenient location for the installation of communications cables including those for computers and alarm systems. It is not uncommon for these plenums to be continuous throughout the length and width of each floor.

When a fire occurs in an area between a floor and a drop ceiling, it may be contained by walls and other building elements which enclose that area. However, if and when the fire reaches the plenum, and if flammable material occupies the plenum, the fire can spread quickly throughout an entire story of the building. The fire could travel along the length of cables which are installed in the plenum. Also, smoke can be conveyed through the plenum to adjacent areas and to other stories.

Generally, a non-plenum cable sheath system which encloses a core of insulated copper conductors and which comprises only a conventional plastic jacket does not exhibit acceptable flame spread and smoke evolution properties. As the temperature in such a cable rises, charring of the jacket material begins. Afterwards, conductor insulation inside the jacket begins to decompose and char. If the jacket char retains its integrity, it functions to insulate the core; if not, it is ruptured by the expanding insulation char, exposing the virgin interior of the jacket and insulation to elevated temperatures. The jacket and the insulation begin to pyrolize and emit flammable gases. These gases ignite and, because of air drafts within the plenum, burn beyond the area of flame impingement, propagating flame and evolving smoke.

As a general rule, the National Electrical Code (NEC) requires that power-limited cables in plenums be enclosed in metal conduits. The initial cost of metal conduits for communications cables in plenums is relatively expensive. Also, conduit is relatively inflexible and difficult to maneuver in plenums. Further, care must be taken during installation to guard against possible electrical shock which may be caused by the conduit engaging exposed electrical service wires or equipment. However, the Code permits certain exceptions to this requirement provided that such cables are tested and approved by an authority such as the Underwriters' Laboratories.

The problem of acceptable plenum cable design is complicated somewhat by the trend to the extension of the use of optical fiber transmission media from a loop to building distribution systems. Not only must the optical fibers be protected from transmission degradation, but also they have properties which differ significantly from those of copper conductors and hence require special treatment. Light transmitting optical fibers are mechanically fragile, exhibiting low strain facture under tensile loading and degraded light transmission when bent. The degradation in transmission which results from bending is known as microbending loss. This loss can occur because of coupling between the jacket and the core. This may result because of shrinkage during cooling of the jacket and because of differential thermal contractions when the thermal properties of the jacket material differ significantly from those of the enclosed optical fibers.

A plenum cable which includes a core of copper conductors is shown in U.S. Pat. No. 4,284,842 which issued on Aug. 18, 1981 in the names of C. J. Arroyo, N. J. Cogelia and R. J. Darsey. The core is enclosed in a thermal core wrap material, a corrugated metallic barrier and two helically wrapped translucent tapes. The foregoing sheath system, which depends on its reflection characteristics to keep heat away from the core, is well suited to larger size copper plenum cables. However, for smaller size cables such as optical fiber cables, the use of a heat reflective metallic shield is not only expensive, but is difficult to form about the core.

The prior art has addressed the problem of cable jackets that contribute to flame spread and smoke evolution also through the use of fluoropolymers. These, together with layers of other materials, have been used to control char development, jacket integrity and air permeability to minimize restrictions on choices of materials for insulation within the core. In one prior art small size plenum cable, disclosed in application Ser. No. 626,085 filed June 29, 1984 in the names of C. J. Arroyo et al and now U.S. Pat. No. 4,605,818, a sheath system includes a layer of a woven material which is impregnated with a fluorocarbon resin and which encloses a core. The woven layer has an air permeability which is sufficiently low to minimize gaseous flow through the woven layer and to delay heat transfer to the core. An outer jacket of an extrudable fluoropolymer material encloses the layer of woven material.

The use of fluoropolymers, with or without underlying protective layers, for optical fiber plenum cable jackets requires special consideration of material properties such as crystallinity, and coupling between the jacket and the optical fiber core detrimental effects on the optical fibers. If the jacket is coupled to the optical fiber core, the shrinkage of fluoropolymer plastic material, which is semi-crystalline, following extrusion puts the optical fiber in compression which results in microbending losses in the fiber. Further, its thermal expansion coefficients relative to glass are large, thereby compromising the stability of optical performance over varying thermal operation conditions.

What is still sought for optical fiber plenum cable is a relatively inexpensive sheath system having fire retardant and low smoke evolution properties. The sought-after cable desirably is as easy to manufacture as presently available products. Further, the sheath system should be one which minimizes and controls the coupling of the jacket material on the enclosed optical fiber core.

SUMMARY OF THE INVENTION

The foregoing problems have been overcome by the sheath system of an optical fiber cable of this invention. The cable includes a core comprising at least one optical fiber, and means for providing the cable with predetermined strength characteristics. The optical fiber cable includes an outer jacket which comprises a plastic material which is decoupled sufficiently from the core to avoid inducing microbending losses in the optical fiber. In one embodiment, which is ideally suited for use in plenums, each of two optical fibers is enclosed with a layer of material which provides strength properties for the cable. In another embodiment, the core which comprises a plurality of optical fibers is wrapped with the same material.

A fluoropolymer jacket provides excellent flame retardance through it superior heat resistance to high temperature. Also contributing to the properties of flame retardance and low smoke evolution of the cable in at least one embodiment is a woven glass layer which is dipsosed about the core and which has an air permeability that falls in a predetermined range.

In a method of making one embodiment of a plenum cable of this invention, which core comprising a pair of optical fibers, each optical fiber is enclosed in a protective coating and a buffer. The coated optical fiber is enclosed in a fire retardant material which is served on and which provides the cable with suitable strength properties. The fire retardant material is enclosed in an inner jacket comprising a flame retardant plastic material after which the core comprising two individually jacketed optical fibers is wrapped in a material such as a woven glass material having a relatively low air permeability. The partially sheathed core is moved through an extruder where an outer jacket of plastic material is formed thereabout. The individual inner jacket for each optical fiber and the outer jacket are comprised of a material which is decoupled sufficiently from the core to avoid undue compression of the optical fibers. In a preferred embodiment, that material is a fluoropolymer material.

BRIEF DESCRIPTION OF THE DRAWINGS

Other features of the present invention will be more readily understood from the following description of specific embodiments thereof when read in conjunction with the accompanying drawings in which:

FIG. 1 is a perspective view of an optical fiber cable of this invention which includes a sheath system that has superior flame and smoke retardance properties;

FIG. 2 is an end view of the cable of FIG. 1;

FIG. 3 is an elevational view of a portion of a building to show an environment in which the cable of this invention may be used;

FIG. 4 is a schematic view of a manufacturing line which is used to make the cable of FIG. 1;

FIG. 5 is an end cross-sectional view of another optical fiber cable of this invention;

FIG. 6 is an end cross-sectional view of still another optical fiber cable of this invention.

FIG. 7 is an end cross-sectional view of an alternate embodiment of the cable of FIG. 6; and FIG. 8 is a schematic view of a manufacturing line which may be used to make the cables of FIGS. 5-7.

DETAILED DESCRIPTION

Referring now to FIG. 1 and 2, there is shown a preferred embodiment of a cable 20 of this invention. The cable 20 comprises a core 21 which includes two optical fibers 22—22 each of which includes the optical fiber itself and a protective coating. For additional mechanical protection, each of the optical fibers 22—22 also is provided with a cover 26 which is called a buffer. Typically, the buffer is made of polyvinyl chloride (PVC) or other plastic material. The buffer 26 also increases the size of the optical fiber which provides for improved handling.

Because the cable 20 is intended to be used in a plenum 27 (see FIG. 3), it must meet industry standards for resistance to flame spread and smoke evolution. These are established for example in Underwriters' Laboratories test UL 910. The cable 20 of this invention is provided with a sheat system which meets these standards. Although some optical fiber plenum cables may include twelve or more optical fibers, many such cables include as few as two.

About each of the buffered optical fibers in the cable 20 is provided a non-metallic strength member in the form of a layer 28. The layer 28 provides the cable 20 with predetermined strength characteristics. The layer 28 comprises a material having a relatively low heat absorptivity which enhances flame retardance and smoke suppression. Absorptive power or the absorptivity of a material is measured by the fraction of the radiant energy falling upon the material which is absorbed or transformed into heat. It is the ratio of the radiation absorbed by any material to that absorbed under the same conditions by a so-called black body. An arrangement or a material which will absorb all the radiant energy at all wavelengths and will reflect none is called a perfect black body. This ratio varies with the character of the surface and the wavelength of the incident energy. In a chart on Page E225 of the 54th edition of the *Handbook of Chemistry and Physics* as published by the CRC Press of Cleveland, Ohio, the coefficient of absorption of black matter is given as 0.97 whereas that for white lead paint is 0.25.

In a preferred embodiment, the layer 28 comprises an aramid fibrous material having a heat absorptivity of about 0.45. It is characterized also by a relatively high compressibility. An aramid fiber is defined as a long chain synthetic polyamide having at least 85% of its amide linkages attached directly to two aromatic rings. Aramid fibers exhibit low flammability, high strength and high modulus.

The layer 28 may be made of a served aramid fibrous strand material which is preferred, or it may be applied in the form of a woven strip. If served, it is applied by serving heads of well known apparatus. Woven fabric is comprised of two sets of yarns, warp and filling and is formed by weaving, which is the interlacing of these sets of yarns to form a fabric.

The layer 28 is capable of being compressed by the PVC buffer insulation 26 when it intumesces and expands under the application of heat. During a fire, portions of the core char. If this char is not allowed to develop, it breaks down and gases are emitted. Desirably, the layer 28 conforms to the growth of the char and allows it to develop. As a result, the uncharred PVC insulation is further insulated from the heat.

It has been found that a KEVLAR ® aramid fibrous material is suitable for the strength layer 28. This aramid fiber is described in a product brochure entitled "Characteristics and Uses of Kevlar ® 49 Aramid High Modulus Organic Fiber" and designated Bulletin K-5, dated September 1981 and distributed by the E. I. DuPont Company. KEVLAR fiber yarn has a thermal conductivity of 0.00034 cal cm/cm² sec. °C. The KEVLAR yarn is preferred because of its relatively high strength per unit volume. The yarn is applied about the buffered optical fiber by well-known serving techniques. Also, the yarn is selected so that its fiber count is at least a predetermined value. Its strength properties are well documented in the above-mentioned bulletin K-5.

The thickness of the served layer 28 and its uniformity also are important. For example, while for a very small size cable, such as a quad, the thickness may be 0.076 cm, a thickness of about 0.152 cm is required for a twelve fiber size cable.

Even after relatively long periods of exposure to high temperatures, the layer 28 retain a relatively high strength and toughness. KEVLAR fiber does not melt nor support combustion but will begin to carbonize at about 427° C. Further, KEVLAR fiber is about 43% lighter than Fiberglas ® fibers.

Because of its relatively low heat absorptivity, the layer 28 delays the flow of convective hot air inwardly toward the core. Also, once the core 21 begins to degrade during a fire, the inner layer 28 impedes the outward flow of gases from the decomposed buffer layer 26. This prevents the movement of these gases into a flame front which could cause ignition and flame spread.

As will be described hereinafter, the fibrous yarn in other embodiments of the cable is served about the core 21 rather than around the individual fibers in the duplex plenum cable 20. The optical fibers 22—22 in the duplex cable 20 are wrapped individually because therein each fiber is destined to be connectorized with a plug which includes epoxy in a receiving cavity to bond to the fibrous yarn. For other than the duplex cable, generally the cable is brought through a grommet in a terminal box, the sheath system removed and the individual fibers routed therein. Also, past a two fiber count, it becomes inefficient to serve a strength member about each individual fiber.

About the strength member 28 of each optical fiber 22 in the cable 20 of FIGS. 1 and 2 is disposed an inner jacket 29 which is made of a plastic material. In order to avoid the application of unduly high stresses to the optical fibers 22—22, the plastic material which comprises the inner jacket 29 is decoupled sufficiently from the underlying strength layer 28 so as to avoid causing microbending losses in the optical fiber. If the inner jacket 29 is coupled to the optical fiber, buckling of the fiber will occur when the jacket material undergoes cooling. This problem can be overcome by manufacturing the cable in such a way that coupling between the jacket 29 and the optical fiber is controlled and preferably is eliminated. The material used and its method of application to the optical fiber core must be such that the transverse as well as the longitudinal contraction is sufficiently low to avoid undue compression of the strength layer 28 and of the optical fibers. If the transverse contraction is too high, buckling and compression of the optical fibers occur which lead to microbending losses and transmission degradation. If the longitudinal contraction is excessive, the jacket material imparts axial forces to the optical fibers which cause buckling and led to microbending losses. As a result of the manner in which the jacket is applied, the layer 28 not only provides strength but also serves as a core wrap and facilitates the development of char during a fire.

In one embodiment, the inner jacket 29 comprises a fluoropolymer material which is cellular in nature. Cellular is intended to mean that the plastic material has been expanded and its volume includes a predetermined percent voids, the voids being interspersed within the solid plastic material. The jacket 29 is made of a fluoropolymer plastic material comprising a fluorinated polymer including fluoride ions in the polymer chain. The fluoropolymer plastic material can withstand relatively high temperatures without degradation and is capable of being extruded. More specifically, in this embodiment, the outer jacket 40 comprises an expanded material such as polyvinylidene fluoride (PVDF), for example expanded KYNAR ® PVDF material, or an expanded PVDF copolymer.

It has been found that a fluoropolymer plastic material which has been expanded to have a percent voids in the range of 20 to 40% and preferably 30% has a shrinkage from its molten state which is sufficiently low to avoid undue stresses on the optical fibers 22—22 of the core. In the manufacture of optical fibers 22—22 having an individual jacket of a cellular form of a plastic material, solid polymers, for example, are mixed with a heat decomposable blowing agent during continuous extrusion of the expanded polymer onto the moving fiber. A suitable flowing agent for expanding the material of the jacket is PVDF blowing agent concentrate 40508-0002 marketed by Soltex Polymer Corporation and manufactured by Solvay & Cie, S.A.

As can be seen in the drawings, a sheath system 30 of the cable 20 includes a core wrap or thermal barrier layer 31 which comprises a heat resistant, woven material. The woven layer 31 is comprised of two sets of yarns, warp and filling formed by weaving, which is the interlacing of these sets of yarns to form a fabric. Warp is defined as the set of yarn in all woven fibers that runs lengthwise and parallel to the selvage. Filling runs from selvage to selvage at right angles to the warp. The warp and filling members determine the window in the woven glass and thereby are partially determinative of the air permeability of the woven glass.

The layer 31 is disposed loosely about the core 21 so that the inner jacket 29 is capable of expanding when it intumesces under the application of heat. To avoid unduly compressing the core, the woven glass layer 31 is wrapped longitudinally about the core 21, instead of helically, with an overlapped seam. During a fire, the core wrap 31 conforms to the growth of the char and allows it to develop. Inasmuch as the core is not wound tightly with the core wrap, the buffering and the inner jacket 29 are allowed to char and expand and to suppress the egress of gases to minimize flame advance. As a result, underlying uncharred insulation is further insulated from the heat.

The woven glass layer 31 of the preferred embodiment is impregnated with a fluorocarbon resin material. It is formed from a glass tape which has a thickness of 0.002 inch and a weight of 1.4 ounces per square yard. The glass tape is one marketed by Burlington Industires and designated 108 woven glass. It has a warp of 60 and a fill of 47. The fluorocarbon resin may be a polytetrafluoroethylene (PTFE) resin, for example, which is available from the E. I. duPont Company. A woven glass tape which has been impregnated with the PTFE resin is available commerically from the Oak Material Group, Inc. under the designation Fluorglas ® tape. The impregnated woven glass tape which is formed into the layer 31 has a width which is dependent on the number of optical fibers in the core.

The woven layer 31 may be characterized by its air permeability. Air permeability of a material is defined as the rate of air flow through the material under a given differential pressure. For the layer 31, it is sufficiently low to minimize the ingress of hot air into the core 21 and to delay heat transfer to the cover for a predetermined time. An air permeability in the range of 0 to 200 cfm is acceptable. The air permeability of the impregnated woven glass layer 31 is in the range of about 0 to 35 cfm.

It has been determined that a core wrap having a relatively low air permeability is important to at least some embodiments of the plenum cable of this invention. The reduction of the flow of hot air and pyrolytic gases provides improved flame retardance and smoke suppression properties in small size cables. Because of its relatively low air permeability, the woven layer impedes the flow of convective hot air inwardly toward the core. Also, once the core 21 begins to degrade during a fire, the woven layer impedes the outward flow of pyrolytic gases from the decomposed PVC which would ignite and contribute to flame spread. Further, after any jacketing has been decomposed, the woven glass layer is effective to delay heat transfer to the core for a predetermined time.

The air permeability of the layer 31 is a function of the size of the window formed between adjacent warping and filling, of the degree of impregnation, and of the amount of air entrapped in the woven material during impregnation. In order to provide an air permeability which is sufficiently low to minimize gaseous flow through the sheath system, the degreee of impregnation employed is a function of the number of optical fibers. This may be decreased as the number of optical fibers decreases.

The amount of air entrapped in the woven layer 31 during impregnation affects thermal conductivity as well as air permeability. As the degree of impregnation decreases, the amount of air entrapped increases. As the amount of air entrapped increases, the thermal conductivity decreases. For higher count cables, a 70% by weight impregnation results in a higher thermal conductivity but a lower air permeability than for a lower count cable in which there is 30% by weight impregnation, for example.

The thermal barrier layer 31 has a dual function. Not only does it provide additional resistance to flame spread, but also it facilitates the extrusion of a jacket by providing a relatively smooth surface over which to apply jacketing material.

To provide thermomechanical strength, the cable sheath system 30 includes an outer jacket 40 (see FIGS. 1 and 2). Similar to the relationship between the inner jacket 29 and the optical fiber core, the jacket 40 may be applied, if necessary, so that it is decoupled from the layer 31 to prevent causing microbending losses in the optical fiber. In one embodiment, the outer jacket is made of a cellular fluoropolymer plastic material comprising an expanded material such as expanded PVDF or an expanded PVDF copolymer which is used for the inner jacket 29. A suitable blowing agent concentrate is the same as that used with the inner jacket 29. It has been found that in a preferred embodiment, the percent voids for the expanded material comprising the jacket is in the range of 20 to 40% with the preferred being 30%. This degree of expansion insures that when the jacket material 40 shrinks during cooling from a molten state, undue stresses are not imparted to the optical fibers 22—22 of the core.

The cellular jacket material meets two objectives in that its resistance to flame spread and to smoke evolution is excellent and its contraction during cooling from a molten state is sufficiently controlled to avoid undue stresses being imparted to the optical fibers before the jacket engages the strength layer.

The components of the sheath system 30 cooperate to provide a system which delays the transfer of heat energy into the core 21 for a predetermined time. This heat energy, at least for a predetermimed time, is controlled by the sheath system comprising the woven core wrap and the jacket 40.

The use of a cellular plastic material also has another advantage. It reduces the weight of the cable. In an optical fiber cable, an objective is to minimize the static load on the cable. As the static load increases, the strength system for the cable may have to be reinforced.

In the manufacture of the cable 20, a core 21 which may comprise the optical fibers 22—22 that each include a buffer layer, a strength member 28 and a PVDF inner jacket 29 is advanced along a manufacturing line 50 (see FIG. 4). The buffered optical fibers 22—22 are payed off from supplies 51—51 by a capstan 52. A strip 53 of woven glass material is wrapped longitudinally about the core 21 by a devide 56 to form the layer 31. The layer 31 presents a relatively smooth surface over which the PVDF jacket material having a blowing agent concentrate incorporated thereinto is extruded.

As mentioned hereinbefore, it has been found that the tightness of the enclosure of the sheath system 30, which comprises the inner layer 31 and the extruded jacket 40, about the core, affects the amount of char that is formed, and could increase the evolution of smoke. Accordingly, care must be taken when extruding the outer jacket 40 about the core 21 to avoid undue compression of the inner layer 31. If this precautionary measure were not taken, the layer 31 would be compressed so much during manufacture that its effectiveness as a thermal barrier would be reduced. Also, he charring mechansim would be restricted, and this would lead to the emission of volatile gases which might escape through the longitudinal seam of the core wrap 31 and ignite downstream. Further, undue compression in the optical fiber core would cause microbending losses. Also, care must be taken to control the de-coupling between the inner jacket 29 and the buffered optical fiber.

Afterwards, the wrapped core is advanced through an extruder 58 wherein the outer jacket 40 of a cellular fluoropolymer material such as KYNAR PVDF is caused to enclosre the wrapped core. The jacketed cable is advanced through a trough 59 wherein it is cooled by water. The complete plenum cable is taken up on a reel 61.

The desired ce-coupling between each inner jacket 29 and the optical fiber 22 may be accomplished by tubing the plastic of the inner jacket about the buffered optical fiber and then drawing down the plastic while it is being advanced through a vacuum sizing unit (no shown in FIG. 4). This same technique may be applied in order to apply the jacket 40 over the barrier 31.

Plenum cables in accordance with this invention may include more than the two optical fibers shown in FIGS. and 2. Going now to FIG. 5, there is shown a plenum cable 70 which includes a core 72 of four optical fibers 22—22. As in the embodiment shown in FIG. 1, each of the optical fibers in FIG. 5 is coated and provided with a buffer layer. A filler member 74 which is made of a plastic material, possibly a plastic coated strength member, is disposed in a void 72. Served about the quad of optical fibers 22—22 is a strength layer 76 of KEVLAR yarn which holds the fibers arranged as shown and which provides additional resistance to flame spread and smoke evolution. Over the yarn 76 of disposed a jacket 78 which in a preferred embodiment is a cellular PVDF material. It has been found that a woven glass layer 31 is unnecessary in this embodiment in order to meet fire retardance and smoke evolution requirements.

As in the cable 20 of FIG. 1, the jacket of the cable in FIG. 5 is tubed over the core and the strength layer 76 and drawn down while the plastic is moved through a vacuum sizing unit (not shown). This is done to control the coupling of the jacket material to the core so that it is sufficiently low to avoid microbending stresses in the optical fibers. It may be desirable to use the arrangement of FIG. 5 to provide a duplex cable. This may be accomplished by replacing diagonally opposite optical fibers therein with spacer members. Such a design may be more economical to produce than that shown in FIG. 1.

Still another embodiment is shown in FIG. 6. There, a cable 80 includes a central strength member 82 having a plastic coating 83 disposed thereabout. The strength member and the coating thereon together comprise a filler 84. The central strength member is comprised of 0.100 inch KEVLAR plastic-PVC or fluoropolymer mixture. About the filler 84 are disposed a plurality of optical fibers 22—22 each having a coating and a buffer layer thereabout. As in the quad cable 70, a layer 86 of KEVLAR yarn encloses the plurality of optical fibers 22—22. In this cable, an outer portion of the sheath system is the same as that used in the duplex cable 20 of FIG. 1. It includes an outer jacket 89 comprised of a PVDF material.

In an alternative embodiment of FIG. 6, a cable 91 includes a woven glass layer 93 disposed beneath a KEVLAR yarn, served strength layer 95 (see FIG. 7). This is done because the seam of the woven glass layer has a tendency to protrude into the PVDF outer jacket 89. With the woven glass layer 93 underlying the served layer 95, there is no intrusion of portions of the seam of the woven glass layer into the jacket 89 thereby avoiding any unwanted notching of the jacket material.

Going now to FIG. 8, there is shown a schematic view of a manufacturing line 100 which is used to manufacture the cables of FIG. 5, FIG. 6, or FIG. 7. Buffered optical fibers 22—22 are pulled from supplies 102—102 mounted on a floating type stranding carriage by a capstan 101 and assembled by a device 104 about the filler member which is pulled from a supply 105. Afterwards, the stranded optical fibers are moved through a device 106 which includes a plurality of serving heads 108—108 which are rotatably mounted on spindles 107—107. KEVLAR yarn is pulled from the heads and moved through tensioning devices 110—110 and served onto the advancing stranded core. In the manufacture of the cable of FIG. 7, the woven glass strip 113 is applied prior to the serving heads 108—108. After leaving the forming device 112, the partially completed cable is moved through an extruder 116 wherein a layer of PVDF plastic material is tubed over the core to enclosure the woven glass strip. The cable is moved vacuum sizing device 117, a water trough 118 and onto a takeup reel 122. It should be apparent that the individually served optical fibers 22—22 of FIG. 2 could be made using an apparatus which includes the serving heads 108—108 with extruders before and after for applying the buffer 26 and inner jacket 29 to each. The vacuum sizing device is effective to cause the outer jacket of the cable to be decoupled sufficiently from the strength member layer and hence from the enclosed core of optical fibers so that microbending losses are not introduced into the core. As a result of the manner in which the jacket is applied, a slight gap is provided between the strength member layer and the jacket. This gap may vary as a function of the cable structure and typically is in the range of about 0.010 to 0.030 inch. This allows the jacket material to shrink independently of the core. In one example, the draw down ratio of the plastic jacket material to that in position on the core is almost 3 to 1.

In making the cables of this invention, the manner in which the strength member yarn is applied is important. served about the advancing core, whether it be a single optical fiber as in FIG. 1 or a plurality as in FIG. 5, 6 or 7, the strength member material is under a predetermined back tension. This prevents the strength member yarn from unravelling and becoming disposed in the gap between the strength member layer and the jacket plastic material.

Flame spread and smoke evolution characteritics of cables of this invention may be demonstrated by using a well known Steiner Tunnel test in accordance with ASTM E-84 as modified for communications cables and now referred to as Underwriters' Laboratories Test UL 910. Test 910 is a test method for determining the relative flame propagation and smoke generating characteristics of cable to be installed in ducts, plenums, and other spaces used for environmental air. A measure of smoke evolution is termed optical density which is an obscuration measurement over a length of time as seen by an optical detector. The lower the optical density, the lower and hence the more desirable is the smoke characteristic. See U.S. Pat. No. 4,510,348 which is incorporated by reference hereinto for representative values of peak optical density. In order to pass the UL 910 test, the flame spread and peak optical density must not exceed 5 feet and 0.50, respectively.

The charring of the PVC buffer along its outwardly facing surface acts to inhibit further degradation of the PVC by blocking internal convective air movements. Charred PVC effectively blocks off a section of the length of cable 20 to localize further PVD decomposition in the portion of the cable adjacent to a flame. This prevents the longitudinal travel of heated air which decomposes the buffer material and causes smoke evolution.

EXAMPLE 1

In one example, a plenum cable made in accordance with this invention includes two coated optical fibers each being provided with a buffer layer of PVC and made as shown in FIG. 2. The individual inner jackets for the optical fibers and the outer jacket were made of a PVDF plastic material. The transverse cross-section of the cable was oval-shaped having a width of 0.200 inch and a height of 0.100 inch. When subjected to the UL 910 test, it was determined that this cable had a flame spread of four feet and a peak smoke optical density of 0.23.

EXAMPLE 2

In a quaded plenum cable such as that shown in FIG. 5, four optical fibers each having a coating and a PVC buffer layer were enclosed in a served KEVLAR yarn and a PVDF outer jacket. This quad cable, when subjected to the UL 910 test, exhibited a flame spread of 4.5 feet and a peak smoke optical density of 0.27.

It is to be understood that the above-described arrangements are simply illustrative of the invention. Other arrangements may be devised by those skilled in the art which will embody the principles of the invention and fall within the scope and spirit thereof.

We claim:

1. An optical fiber plenum cable having relatively low flame and smoke evolution characteristics, said cable comprising:
   a core which includes at least one optical fiber;
   a core wrap comprising a layer of thermally protective non-metallic fibrous material which encloses said optical fiber and which provides said cable with predetermined strength characteristics; and
   a jacket which encloses said core and said layer of fibrous material and which comprises a fire retardant plastic material which is decoupled sufficiently from said layer of thermally protective fibrous material to avoid inducing microbending losses in the at least one optical fiber and to avoid compressing said core wrap and thereby facilitate the formation of char when said cable is subjected to heat such that said cable has a flame spread and peak optical density which do not exceed predetermined values.

2. The optical fiber cable of claim 1, wherein the flame spread and peak optical density values do not exeed 5 feet and 0.50, respectively, and said jacket is spaced from said core wrap by a gap which extends circumferentially of said cable between said core wrap and said jacket.

3. The optical fiber cable of claim 2, wherein the plastic material is a cellular fluoropolymer plastic material having a shrinkage during cooling from a molten state which is sufficiently low to cause said jacket to have a controlled decoupling from said core.

4. The optical fiber cable of claim 3, wherein said cellular plastic material which comprises said jacket is a cellular fluropolymer plastic material having a percent voids in the range of about 20 to 40%.

5. The optical fiber cable of claim 1, which also includes a layer of woven material which encloses said core and which has a longitudinal overlapped seam, said layer of woven material having an air permeability that is sufficiently low to minimize gaseous flow therethrough and to delay heat transfer to the core.

6. The cable of claim 5, wherein the layer of woven material is a woven glass layer which is impregnated with a polytetrafluoroethylene resin.

7. The optical fiber cable of claim 5, wherein the core includes a plurality of optical fibers and a centrally disposed strength member having the plurality of optical fibers disposed thereabout with a filler material being disposed between said optical fibers and said strength member, said layer of fibrous material being a peripheral strength member served about the plurality of optical fibers with said layer of woven material and said jacket enclosing said core.

8. The cable of claim 7, wherein said layer of fibrous material is disposed between said layer of woven material and said core.

9. The cable of claim 7, wherein said layer of woven material is disposed between said layer of fibrous material and said core.

10. The cable of claim 7, wherein said peripheral strength member comprises a layer of thermally protective material having a relatively low heat absorptivity.

11. The optical fiber cable of claim 1, wherein the layer which provides the cable with the predetermined strength characteristic is an aramid fibrous yarn.

12. The optical fiber cable of claim 11, wherein the core includes a plurality of optical fibers and the layer is provided about each of the plurality of optical fibers and wherein each layer is enclosed with a layer of plastic material which is decoupled sufficiently from the enclosed optical fiber to avoid inducing microbending losses in the enclosed optical fiber and said plurality of optical fibers are enclosed by a core wrap comprising a woven glass material having an air permeability which is sufficiently low to minimize gaseous flow therethrough.

13. The cable of claim 1, wherein said cable includes a plurality of optical fibers and said layer of fibrous material encloses said plurality of optical fibers and is enclosed by a jacket comprising a fluoropolymer material which is decoupled sufficiently from said core to avoid inducing microbending losses in the enclosed optical fibers.

14. A method of making an optical fiber cable having fire retardant and low smoke evolution characteristics, said method comprising the steps of:
   providing an optical fiber which is enclosed in a coating;
   enclosing the optical fiber in a core wrap comprising a layer of a thermally protective non-metallic material which provides the cable with suitable strength properties;
   extruding an outer jacket about the material which comprises a fire retardant material and which provides the cable with suitable strength properties, the outer jacket being a plastic material; and
   controlling the drawdown of the plastic material which comprises the jacket about the core wrap to cause the jacket which is disposed about the optical fiber to be decoupled sufficiently therefrom the avoid inducing microbending losses in the optical fiber and to avoid compressing said core wrap thereby causing said core wrap to provide the cable with enhanced flame retardant and smoke evolution characteristics.

15. The method of claim 14, wherein the step of controlling is such that a gap which extends circumferentially of the cable is formed bewteen the core wrap and the jacket.

16. The method of claim 14, wherein the layer of material which provides suitable strength properties has a relatively low heat absorptivity.

17. The method of claim 14, wherein the cable includes a core comprising a plurality of optical fibers and is one which resists flame spread and smoke evolution, and wherein the jacket comprises a material which is fire retardant and which also includes the step of wrapping a layer of material having a relatively low air permeability about the plurality of optical fibers.

18. The method of claim 17, wherein the layer having a relatively low air permeability is a woven glass layer.

19. The method of claim 18, wherein the woven glass layer is wrapped about the core prior to the step of enclosing the optical fibers in the layer of a material which provides the cable with suitable strength properties.

20. The method of claim 17, wherein the layer having a relatively low air permeability is impregnated with a fluorocarbon resin.

* * * * *

UNITED STATES PATENT OFFICE
CERTIFICATE OF CORRECTION

Patent No. 4,781,433     Dated November 1, 1988

Inventor(s) Candido J. Arroyo, Jay T. Loadholt, III, Emanuele Scalco and Palmer D. Thomas It is certified that error appears in the above-identified patent and that said Letters Patent is hereby corrected as shown below:

Title page:

At [75] Inventors: Add

--James R. Holman, Lilburn; and Carla G. Wilson, Decatur; both of GA--

Signed and Sealed this

Sixth Day of March, 1990

Attest:

JEFFREY M. SAMUELS

Attesting Officer     Acting Commissioner of Patents and Trademarks